United States Patent
Chisha et al.

(10) Patent No.: US 8,197,727 B2
(45) Date of Patent: Jun. 12, 2012

(54) METHOD OF MANUFACTURING FORMED ARTICLE, COVERING MEMBER, AND FORMING APPARATUS COMPRISING THE SAME

(75) Inventors: Mikio Chisha, Shinjuku-ku (JP); Masaaki Matsushima, Shinjuku-ku (JP); Noriaki Taguchi, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 47 days.

(21) Appl. No.: 12/095,258

(22) PCT Filed: Nov. 20, 2006

(86) PCT No.: PCT/JP2006/323136
§ 371 (c)(1),
(2), (4) Date: May 28, 2008

(87) PCT Pub. No.: WO2007/063735
PCT Pub. Date: Jun. 7, 2007

(65) Prior Publication Data
US 2009/0289380 A1    Nov. 26, 2009

(30) Foreign Application Priority Data
Nov. 30, 2005   (JP) .................................. 2005-346162

(51) Int. Cl.
*B29D 11/00* (2006.01)
(52) U.S. Cl. .......................................... 264/2.5; 264/1.1
(58) Field of Classification Search .................. 249/204; 264/1.1, 2.5
See application file for complete search history.

(56) References Cited

U.S. PATENT DOCUMENTS

| | | | |
|---|---|---|---|
| 2,015,007 A | 9/1935 | Emerson, Alfred H. | |
| 2,966,421 A * | 12/1960 | Zimmerman et al. | 501/84 |
| 3,607,186 A | 9/1971 | Bognar | |
| 3,623,800 A * | 11/1971 | Volk | 351/169 |
| 4,018,587 A | 4/1977 | Maitenaz | |

(Continued)

FOREIGN PATENT DOCUMENTS

EP    0 154 382 A2    9/1985
(Continued)

OTHER PUBLICATIONS

Fine Ceramics World page on the web, per Kyocera Corporation, as a PDF (Ceramic pdf).*

(Continued)

*Primary Examiner* — Joseph Del Sole
*Assistant Examiner* — Kimberly A Stewart
(74) *Attorney, Agent, or Firm* — Sughrue Mion, PLLC

(57) ABSTRACT

The present invention relates to a method of manufacturing a formed article forming an upper surface of a forming material comprised of a thermosoftening substance into a desired shape by positioning the forming material on a forming surface of a mold and heating the forming material to a temperature permitting deformation to bring a lower surface of the forming material into tight contact with the forming surface. The forming is conducted while an exposed portion on the forming surface side of the mold upon which the forming material has been positioned is covered with a covering member. The present invention further relates to a covering member and a forming apparatus. According to the present invention, formed articles with a desired shape can be formed with high accuracy by preventing the contamination of upper surface of forming materials by foreign matter during forming.

9 Claims, 6 Drawing Sheets

U.S. PATENT DOCUMENTS

| | | | |
|---|---|---|---|
| 4,105,429 A | | 8/1978 | Delgado |
| 4,119,424 A | | 10/1978 | Comperatore |
| 4,349,374 A | * | 9/1982 | Rupp ............................ 65/107 |
| 4,589,901 A | | 5/1986 | Yoshizawa et al. |
| 4,859,225 A | | 8/1989 | Kuster et al. |
| 4,883,524 A | * | 11/1989 | Bristol ............................ 65/37 |
| 5,437,704 A | | 8/1995 | Yli-Vakkuri et al. |
| 5,589,024 A | * | 12/1996 | Blake ............................ 156/245 |
| 5,662,999 A | | 9/1997 | Taniguchi et al. |
| 5,766,542 A | * | 6/1998 | Berrun-Castanon et al. ... 266/44 |
| 6,240,746 B1 | | 6/2001 | Maeda et al. |
| 6,363,747 B1 | | 4/2002 | Budinski et al. |
| 6,623,269 B2 | * | 9/2003 | Tsutsui et al. ................ 432/128 |
| 6,740,366 B2 | | 5/2004 | Hori et al. |
| 7,008,058 B2 | | 3/2006 | Haimeril et al. |
| 2004/0107731 A1 | * | 6/2004 | Doehring et al. ................. 65/81 |
| 2005/0093210 A1 | | 5/2005 | Umetani |
| 2005/0110945 A1 | | 5/2005 | Haimerl et al. |
| 2008/0134721 A1 | | 6/2008 | Maeda |
| 2009/0108477 A1 | | 4/2009 | Yamakaji et al. |
| 2009/0127727 A1 | | 5/2009 | Matsushima et al. |

FOREIGN PATENT DOCUMENTS

| | | | |
|---|---|---|---|
| JP | 55007507 A | 1/1980 | |
| JP | 61-048801 A | 3/1986 | |
| JP | 63-306390 A | 12/1988 | |
| JP | 01-171932 A | 7/1989 | |
| JP | 04-275930 A | 10/1992 | |
| JP | 06-130333 A | 5/1994 | |
| JP | 07-300328 A | 11/1995 | |
| JP | 9-124339 A | 5/1997 | |
| JP | 10-025123 A | 1/1998 | |
| JP | 10-078567 A | 3/1998 | |
| JP | 10-291828 A | 11/1998 | |
| JP | 11-116257 A | 4/1999 | |
| JP | 2000-229319 A | 8/2000 | |
| JP | 2000-302473 A | 10/2000 | |
| JP | 2000-327344 A | 11/2000 | |
| JP | 2001-322830 A | 11/2001 | |
| JP | 2001-335334 A | 12/2001 | |
| JP | 2003-232902 A | 8/2003 | |
| JP | 2005-132679 A | 5/2005 | |
| JP | 2005-350286 A | 12/2005 | |
| JP | 2008-221720 A | 9/2008 | |
| KR | 2002-0060445 A | 7/2002 | |
| RU | SU 121992 A1 | 2/1986 | |
| RU | 2 087 430 C1 | 8/1997 | |
| RU | 2245852 C1 | 2/2005 | |
| SU | 1426954 A2 | 9/1988 | |
| WO | 95-23769 A1 | 9/1995 | |
| WO | 03/079095 A2 | 9/2003 | |
| WO | 2005-108317 A1 | 11/2005 | |
| WO | 2006/095007 A1 | 9/2006 | |
| WO | 2007/058353 A1 | 5/2007 | |
| WO | 2007/063734 A1 | 6/2007 | |
| WO | 2007/063735 A1 | 6/2007 | |
| WO | 2009/096085 A1 | 8/2009 | |
| WO | 2009/144943 A1 | 12/2009 | |

OTHER PUBLICATIONS

Russian Official Decision on Grant dated Oct. 21, 2010, from corresponding Russian Patent Application 2008126281, With an English translation.
International Search Report for International Patent Application No. PCT/JP2006/323135, dated Jan. 9, 2007.
Official Decision on Grant dated Oct. 26, 2010, for Russian Patent Application No. 2008126286, English translation.
International Search Report for International Patent Application No. PCT/JP2010/001343 dated May 25, 2010.
Written Opinion of International Patent Application No. PCT/JP2010/001343, dated May 10, 2010, Partial translation.
International Preliminary Report on Patentability of Chapter I for International Patent Application No. PCT/JP2009/002361, dated Jan. 20, 2011.
International Search Report for International Patent Application No. PCT/JP2009/002361, dated Jul. 14, 2009.
Written Opinion of the ISA for International Patent Application No. PCT/JP2009/002361, dated Jul. 14, 2009.
International Search Report for International Patent Application No. PCT/JP2010/001344, dated May 25, 2010, Partial Translation.
Written Opinion of International Patent Application No. PCT/JP2010/001344, (Form PCT/ISA/237), dated May 25, 2010.
International Search Report for International Patent Application No. PCT/JP2008/071352, dated Feb. 17, 2009.
Official Decision on Grant dated Sep. 10, 2010, for Russian Patent Application No. 2008124837.
International Search Report for International Patent Application No. PCT/JP2006/323134, dated Jan. 9, 2007.
Chinese Office Action dated Jun. 30, 2011, issued in Chinese Patent Application No. 200680043172.0, English translation.
Written Opinion of the ISA for International Patent Application No. PCT/JP2006/323137, dated May 29, 2008.
Official Decision on Grant dated Sep. 7, 2010, issued in Russian Patent Application No. 2008124822, English translation.
International Search Report for International Patent Application No. PCT/JP2006/323137, dated Jan. 9, 2007.

* cited by examiner

[Fig. 1]
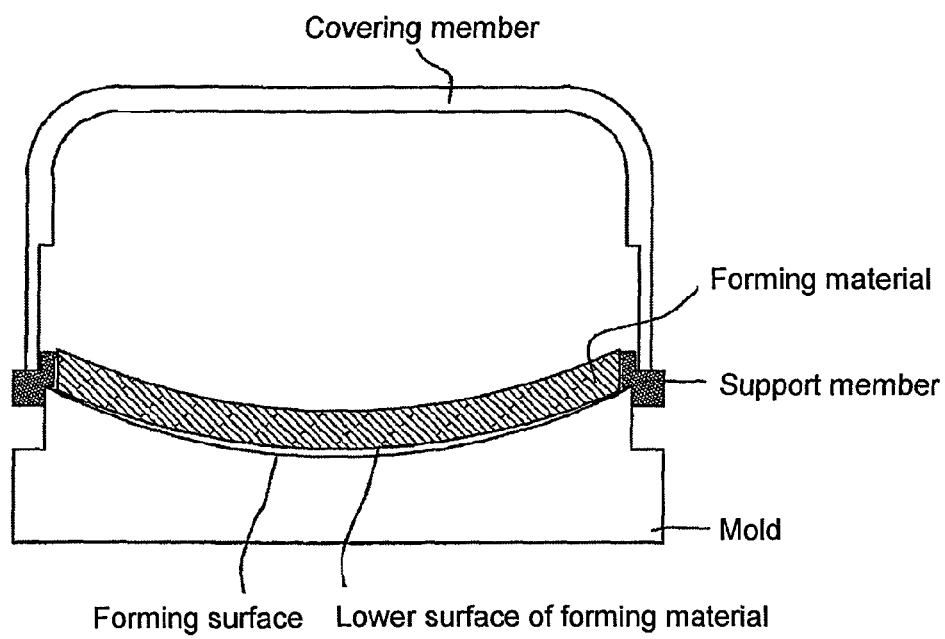
(a)
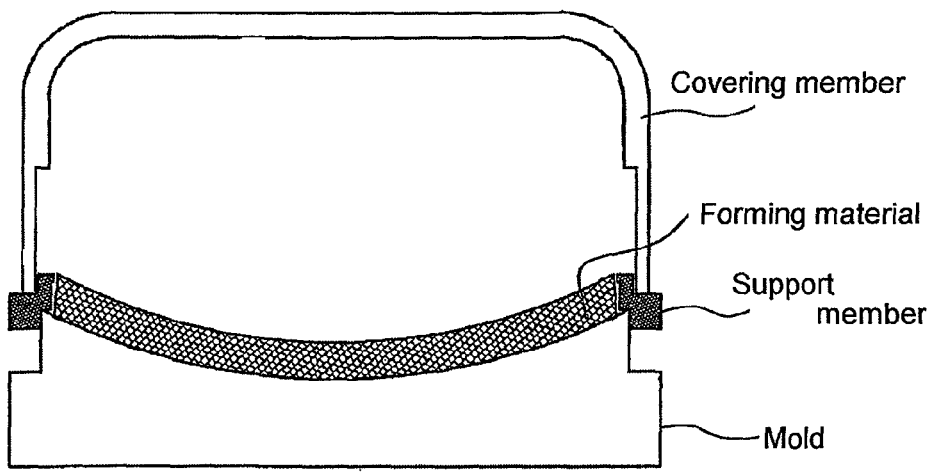
(b)

[Fig. 2]
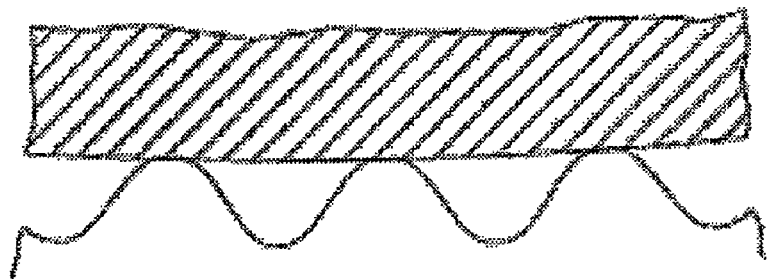
(a)
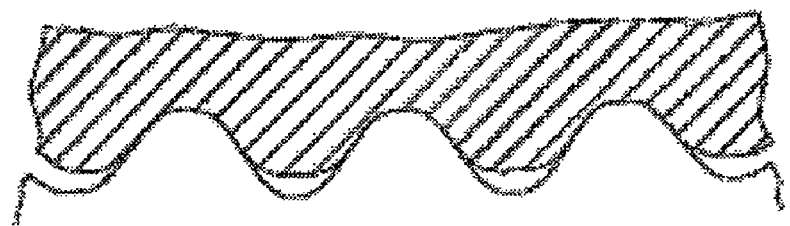
(b)

[Fig. 3]
(a)
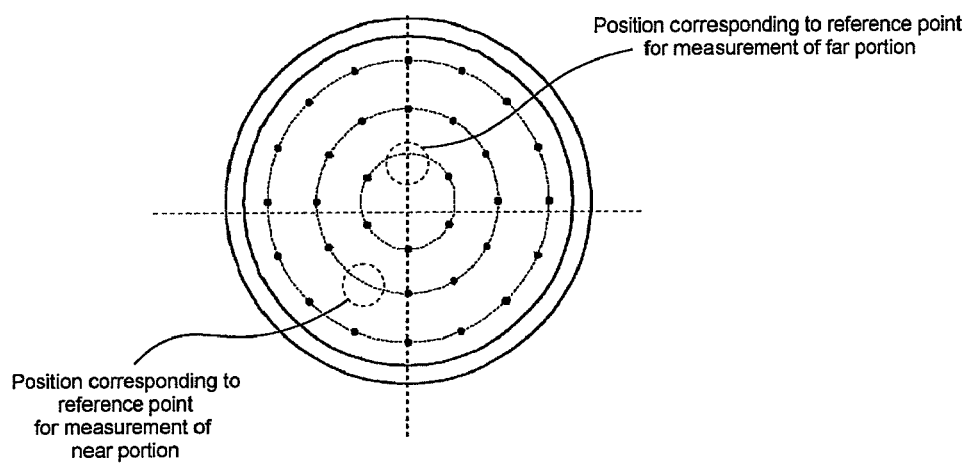
(b)
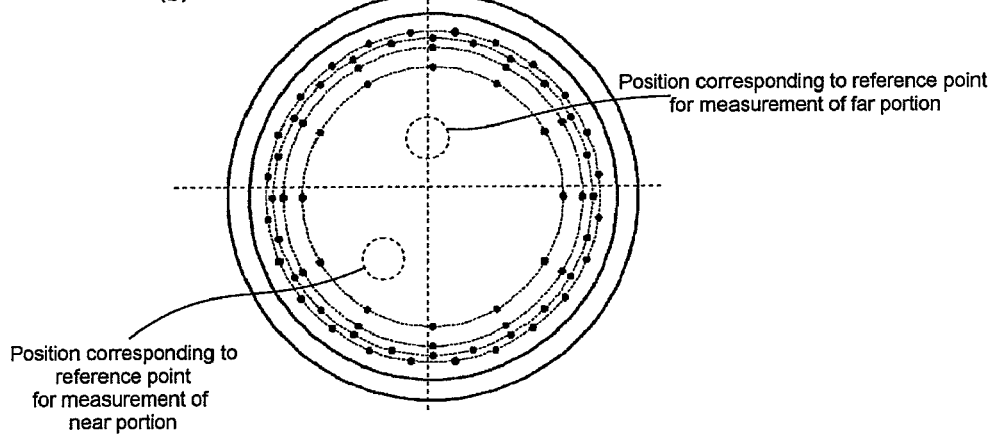
(c)
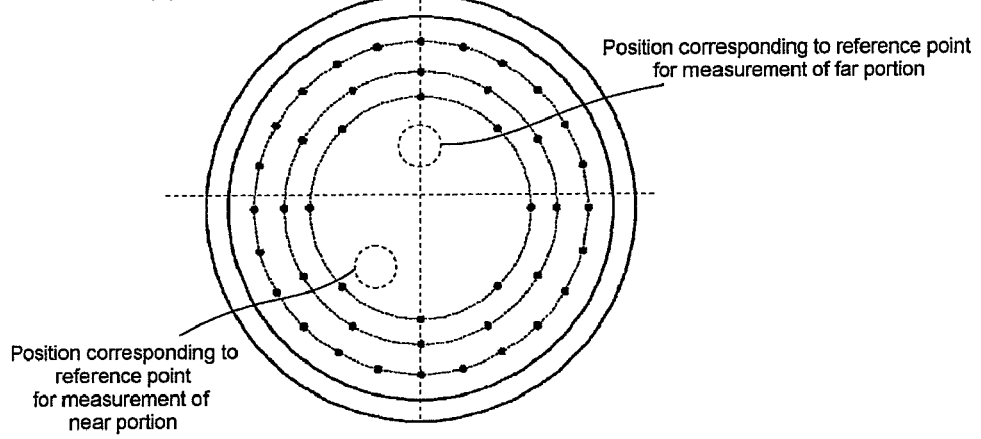

[Fig. 4]
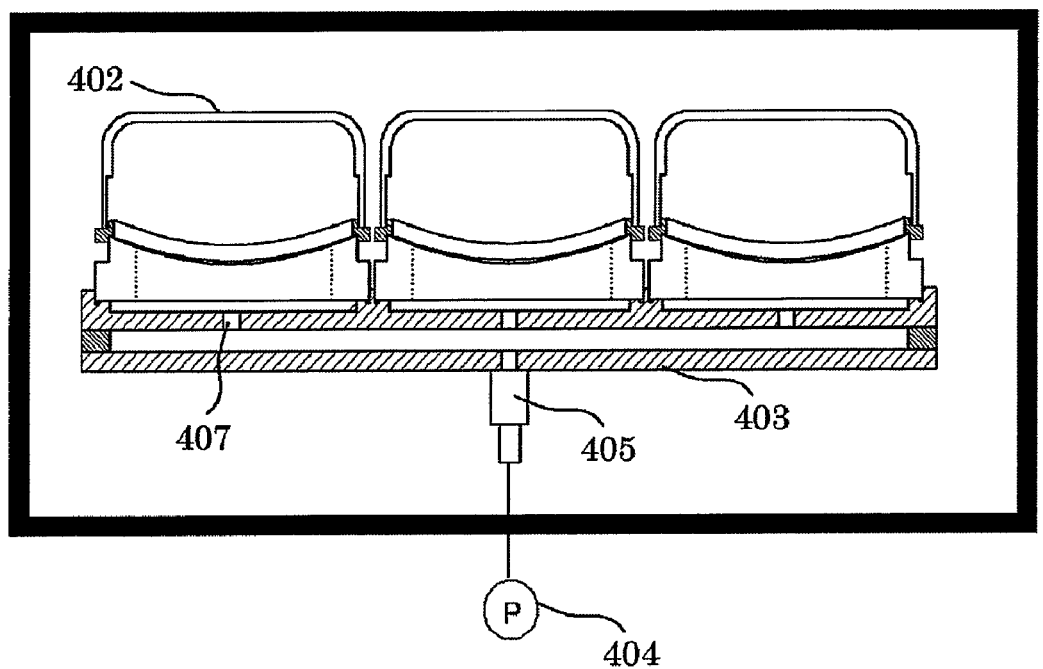

[Fig. 5]
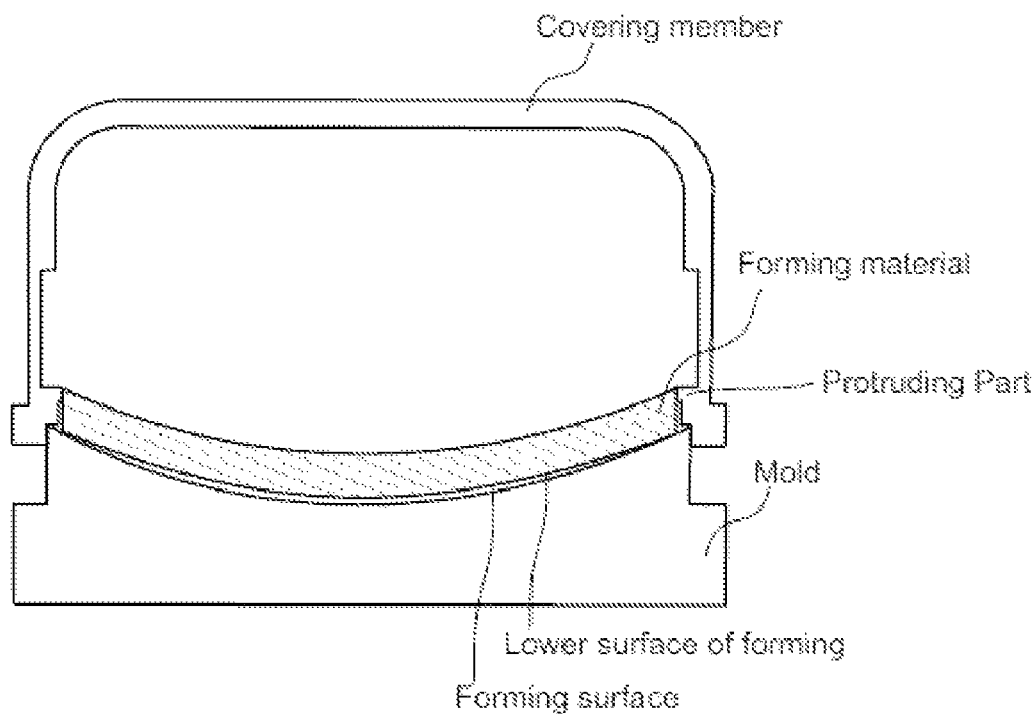
(a)
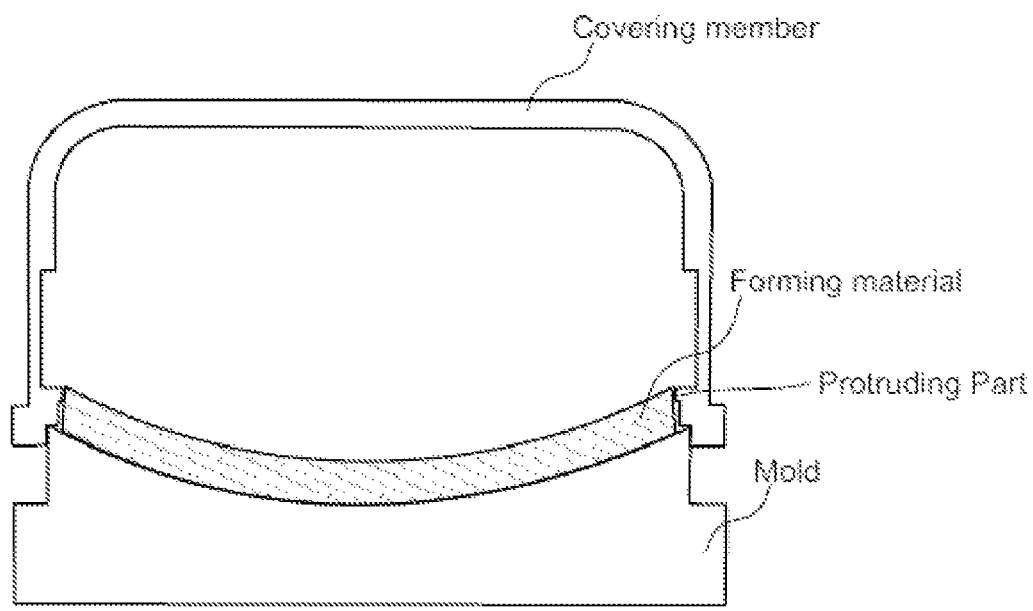
(b)

[Fig. 6]
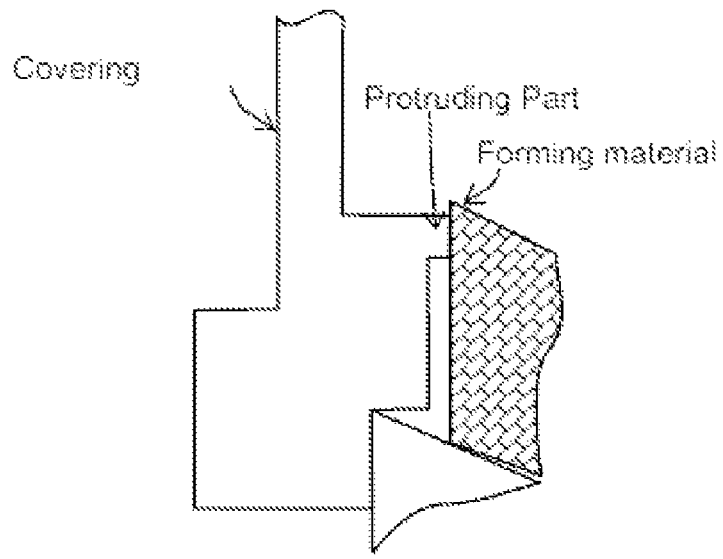
(a)
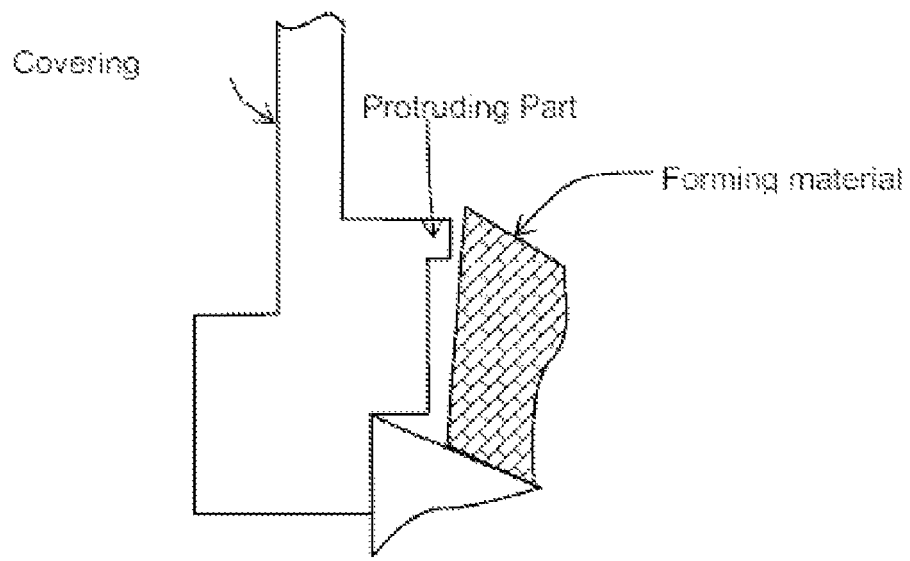
(b)

METHOD OF MANUFACTURING FORMED ARTICLE, COVERING MEMBER, AND FORMING APPARATUS COMPRISING THE SAME

CROSS REFERENCE TO RELATED APPLICATIONS

This application is a National Stage of International Application No. PCT/JP2006/323136 filed on Nov. 20, 2006, claiming priority based on Japanese Application No. 2005-346162, filed Nov. 30, 2005, the contents of all of which are incorporated herein by reference in its entirety.

TECHNICAL FIELD

The present invention relates to a method of manufacturing a formed article by hot sag forming method, and a covering member and a forming apparatus that can be used in the method.

TECHNICAL BACKGROUND

Methods of forming glass molds for eyeglass lenses include employing mechanical grinding and polishing methods, mechanical grinding methods, and electrical processing methods such as electrical discharge processing to produce a heat-resistant base mold, bringing this base mold into contact with a glass blank softened by heating to transfer the surface shape of the base mold, employing a grinding program for each surface shape to be obtained, and forming a base mold having a corresponding surface shape.

In recent years, the demand has increased for multifocal eyeglass lenses being made thinner and lighter by incorporation of axially symmetric, aspherical lens design. The hot sag molding method has been proposed (see Japanese Unexamined Patent Publication (KOKAI) Heisei Nos. 6-130333 and 4-275930) as a method for forming molds to produce eyeglass lenses having such complex shapes.

DISCLOSURE OF THE INVENTION

In the hot sag forming method, a forming material comprised of a thermosoftening substance such as glass is placed on a mold, and softened by being heated to a temperature greater than or equal to its softening point, causing it to tightly contact with the mold. The shape of the mold is thus transferred to the upper surface of the forming material, yielding a formed article of desired surface shape. When forming a mold for eyeglass lenses, for example, high surface accuracy is required for the upper surface of the forming material because it becomes a surface for forming an optical functional surface.

It is an object of the present invention to provide a means for manufacturing a formed article with a desired surface shape by forming an upper surface of a forming material with high accuracy.

In a conventional hot sag forming method, foreign matter such as dusts in air and debris in an electric furnace may scatter and contaminate the upper surface of the forming material positioned on the mold during forming. However, such contamination of foreign matter on the upper surface may cause deterioration of the surface accuracy even if only slightly. It is conceivable that the whole process of forming is conducted in a clean room for preventing the contamination by foreign matter. However, installation of large-scale clean room including an electric furnace is not preferable because it causes significant increase of manufacture cost. Accordingly, the present inventors conducted extensive research, resulting in discovery that by covering an exposed portion on a forming surface side of a mold with a covering member for preventing the contamination of an upper surface of a forming material by foreign matter, it was possible to form the upper surface of the forming material with high accuracy without increase of manufacture cost; the present invention was devised on this basis.

The present invention relates to:
a method of manufacturing a formed article forming an upper surface of a forming material comprised of a thermosoftening substance into a desired shape by positioning the forming material on a forming surface of a mold and heating the forming material to a temperature permitting deformation to bring a lower surface of the forming material into tight contact with the forming surface, wherein
the forming is conducted while an exposed portion on the forming surface side of the mold upon which the forming material has been positioned is covered with a covering member.

The present invention further relates to:
a covering member for use in a forming method forming an upper surface of a forming material comprised of a thermosoftening substance into a desired shape by positioning the forming material on a forming surface of a mold and heating the forming material to a temperature permitting deformation to bring a lower surface of the forming material into tight contact with the forming surface, the covering member being used for covering an exposed portion on the forming surface side of the mold upon which the forming material has been positioned.

The present invention further relates to:
a forming apparatus for use in a forming method forming an upper surface of a forming material comprised of a thermosoftening substance into a desired shape by positioning the forming material on a forming surface of a mold and heating the forming material to a temperature permitting deformation to bring a lower surface of the forming material into tight contact with the forming surface, comprising:
a mold and the covering member of the present invention, the covering member forming a covered space over an exposed portion on the forming surface side of the mold upon which the forming material has been positioned.

According to the present invention, formed articles with a desired shape can be formed with high accuracy by preventing the contamination of upper surface of forming materials by foreign matter during forming.

BEST MODE FOR CARRYING OUT THE INVENTION

The present invention will be described in greater detail below.

The method of manufacturing a formed article of the present invention is a method of manufacturing a formed article forming an upper surface of a forming material comprised of a thermosoftening substance into a desired shape by positioning the forming material on a forming surface of a mold and heating the forming material to a temperature permitting deformation to bring a lower surface of the forming material into tight contact with the forming surface, wherein the forming is conducted while an exposed portion on the forming surface side of the mold upon which the forming material has been positioned is covered with a covering member. In the present invention, the term "covering" means separation of the interior space from the exterior to a degree at which foreign matter such as dust and debris do not enter; the passage of air is permitted.

The surface of the forming material that has been heat-softened is extremely reactive. Since the forming step is normally quite protracted, any foreign matter such as dust in the air and debris in the electric furnace that adheres to the upper surface of the forming material during this period adheres quite strongly, compromising forming precision. Thus, there is a risk of not being able to form an optical surface. Conversely, in the present invention, since the forming material is heat-softened with the exposed portion on the forming surface side of the glass material covered with the covering member, contamination by the above foreign matter can be prevented. Further, using a covering member as described above affords the further advantage of not requiring the installation of a large-scale clean room device containing the electric furnace.

The covering member may be of any shape that will cover the exposed portion on the forming surface side of the mold on which the forming material has been positioned. An example of such a covering member will be described based on FIG. 1. However, the present invention is not limited to the embodiment shown in FIG. 1. Below, the covering member is described in the form of a lid. However, the covering member in the present invention is not limited to being a lid.

FIG. 1 is a schematic diagram of a mold on which forming surface a forming material is positioned and over which upper exposed portion a lid member is positioned. FIG. 1(a) shows a state before heat-softening and FIG. 1(b) shows a state after heat-softening. In the embodiment shown in FIG. 1, an annular support member is positioned between the lid member and the mold, and the edge surface of the step portion of the circumference of the support member is fit into the edge surface of the opening of the lid. When such a support member is not employed, it suffices to provide a step member to support the covering member on the circumference of the mold and to fit the edge surface of the step member into the opening of the covering member.

The lid member shown in FIG. 1 forms a portion of cylindrical shape. Only one bottom surface of the cylindrical shape is open, there being space present in the interior. The dimensions of the cover member are not specifically limited, but from the perspective of shock resistance and thermal conduction efficiency, a thickness of about 1 to 5 mm, an internal height of about 5 to 100 mm, preferably 30 to 60 mm, are desirable.

A step mount part is formed inside the lid member shown in FIG. 1. The thickness of the lateral surface from the step mount part to the opening is thinner than the lateral surface from the upper surface to the step mount part. Making the edge surface of the opening of the covering member thin in this manner reduces the contact surface between the covering member and the support member (the mold when a support member is not employed) and increases the pressure per unit area that is exerted on the edge surface of the opening by the weight of the covering member itself, permitting greater air tightness within the covering member. When a support member is employed as shown in FIG. 1 and the area of the edge surface of the opening of the lid portion is made small, it becomes possible to reduce the area of contact between the support member and the covering member, thereby reducing the overall size of the support member. Reduction in the size of the support member reduces the amount of thermal expansion of the support member, thereby enhancing the air tightness of the cover member.

The edge surface of the opening of the covering member fitting into the mold or support member is desirably a smooth surface so as to enhance tightness. Further, to achieve uniform heat distribution throughout the glass material, the inside upper surface facing the opening of the covering member is desirably approximate in shape to the upper surface of the glass material, and preferably roughly similar in shape to the shape of the upper surface of the glass material. The inside upper surface facing the opening of the lid member is desirably a roughly flat surface. When the inside upper surface shape of the covering member is approximate in shape to the upper surface of the glass material, it becomes possible to uniformly irradiate the glass material positioned on the forming surface with radiant heat from the covering member, enhancing the uniformity of heat distribution of the glass material. However, the shape of the upper surface of the glass material varies by item. Accordingly, to ensure uniformity of heat distribution in the glass material even when forming multiple glass materials of different upper surface shapes, it is desirable for the inside upper surface of the covering member to be a roughly flat surface. Further, as shown in FIG. 1, the rim portion of the inside upper surface of the covering member is desirably fashioned into a shape with rounded off corners. When corners are present, the heat distribution tends to become partially nonuniform. By providing a rounded off shape as shown in FIG. 1, the heat distribution within the covering member can be rendered uniform. For example, employing a rounded off shape such as set forth above effectively enhances durability when the covering member is made of ceramic, since ceramic tends to break when corners are present.

The covering member fits into the mold or a support member positioned on the mold, thereby separating the interior of the covering member from the outside atmosphere. Separating the interior of the covering member from the outside atmosphere in this manner permits prevention of the scattering of and contamination by foreign matter such as dust and debris, as well as affording a buffering effect that alleviates nonuniformity of temperature distribution and sudden changes in temperature in the atmosphere to which the forming material is exposed. In the conventional hot sag forming method, the forming material is positioned on the mold and introduced into a furnace together with the mold. However, since the heat distribution within the furnace is uneven, it is difficult to uniformly heat multiple glass materials within the furnace. Further, since changes in temperature in the furnace directly affect the glass material, there is a risk of distortion and the like being produced by sudden changes in temperature.

By contrast, the covering member temporarily retains external heat and the covering member itself achieves a uniform temperature distribution. The accumulated heat is then radiated to the interior from the covering member. As set forth above, the shape of the inside upper surface of the covering member can be adjusted to effect controls so that heat that is radiated from various parts of the covering member as a heat source is radiated uniformly onto the glass material, permitting uniform heating of the forming material. Further, sharp temperature changes within the furnace are alleviated by the covering member, preventing the distortion and the like caused by such sharp temperature changes. To conduct heat-softening of the forming material well, the thermal conductivity of the covering member is desirably 3 to 170 W/mk, preferably 90 to 120 W/mk.

The covering member is desirably comprised of a ceramic material with good heat resistance. Examples of such ceramic materials are: alumina-based ($Al_2O_3$), AlTiC-based ($Al_2O_3$—TiC), zirconia-based ($ZrO_2$), silicon nitride-based ($Si_3N_4$), aluminum nitride-based (AlN), and silicon carbide-based (SiC) ceramics, as well as other ceramics having primary components in the form of $SiO_2$, $Al_2O_3$, or MgO. Here, the term "having primary components in the form of" means that these components account for equal to or greater than 50 mass percent of the structural components of the covering member.

A ceramic comprising equal to or greater than 99 percent of $SiO_2$, $Al_2O_3$, and/or MgO, with the remainder being $K_2O$ or the like, is a suitable heat-resistant material for use in the covering member.

First, a material having a hardness (Vickers hardness) of 7 to 24 Hv, a curvature strength of 400 to 2,000 MPa, a Young's modulus of 180 to 410 GPa, a coefficient of linear expansion of 4.30 to 10.8×10E-6, a heat resistance temperature of 750 to 850° C., and a density of 3.10 to 10.70 g/cm³ is an example of a suitable material for the covering member. Second, a material having a hardness (Vickers hardness) of 7 to 15 Hv, a Young's modulus of 190 to 210 GPa, a coefficient of linear expansion of 6.0 to 7.0×10E-6, and a heat resistance temperature of 775 to 825° C. is particularly suitable. Third, a material having a hardness (Vickers hardness) of 9 to 15 Hv, a Young's modulus of 180 to 402 GPa, a coefficient of linear expansion of 4.30 to 10.8×10E-6, and a heat resistance temperature of equal to or higher than 800° C. is particularly suitable. The material of the covering member is also desirably hydrophobic.

The method of manufacturing the covering member is not specifically limited. For example, when the covering member is made of ceramic, it can be produced by powder metallurgy. Specifically, a ceramic powder is packed into a metal mold serving as the casting mold for the covering member and press molding is conducted. Next, the molded ceramic is heated for a prescribed period (for example, about 10 hours) at an elevated temperature of greater than or equal to 1,000° C. (for example, 1,550 to 1,750° C.) to obtain a covering member in the form of a sintered ceramic member. Subsequently, the edge surface of the opening of the covering member is desirably processed for smoothness. This smoothness processing is not specifically limited, and may be conducted by the usual chamfering methods. For example, a diamond dish form with a flat surface can be mounted on the lower shaft of a processing device and rotated at about 200 to 300 rpm to grind the lateral surface of the opening portion of the covering member and obtain a smooth surface. In smoothness processing, it is desirable to feed water (about 1 to 2 L/minute, for example) to the processed surface for cooling.

In the case of a ceramic covering member, it is desirable to process the upper inside surface of the covering member to prevent the scattering of particles. This is to prevent microparticles of ceramic from falling off during forming and contaminating the upper surface of the glass material. The method of applying a glaze and sintering it on can be employed as processing to prevent particle scattering. In the above-described steps of manufacturing the covering member, a glaze can be applied to the upper inside surface of the covering member after press molding but before sintering, so that sintering tightly adheres the glaze to the upper inside surface of the covering member. It suffices to conduct processing to prevent particle scattering at least on the upper inside surface of the covering member facing the upper surface of the glass material. When conducting forming while aspirating air through holes formed in the mold as set forth further below, it is desirable to process the upper inside surface of the covering member to prevent particle scattering while leaving the lateral surfaces unprocessed to allow the passage of air.

A glaze is a viscous substance containing glass particles that is commonly employed to impart luster to the surface of pottery. Generally, glazes are comprised of $SiO_2$, $Al_2O_3$, CaO, MgO, $K_2O$, $Na_2O$, $Fe_2O_3$, $Li_2O$, and the like. After applying the glaze on the upper inside surface of the covering member, it is sintered at a temperature exceeding its melting point to form a coating layer on the inside surface of the covering member by melting the glass particles. This coating layer can prevent ceramic particles from scattering onto the upper surface of the glass material. A glaze having a melting point higher than the heat softening temperature of the glass material, such as a glaze having a melting point of 1,150 to 1,300° C., may be employed. The coating layer formed with a glaze having a melting point higher than the heat softening temperature of the glass material is desirable because it will remain unmelted during molding, preventing particles from scattering.

Known molds that are generally employed in the hot sag forming method can be employed as the mold on which the forming material is positioned. Further, a mold having a forming surface of prescribed roughness is desirably employed in the present invention.

The forming surface of the mold generally employed in hot sag forming method is mirror processed by polishing. However, when the forming surface of the mold coming into contact with the forming material is a smooth surface such as a polished surface, it often fuses to the forming material, the surface of the mold is scratched during removal of the glass material, or the like, compromising durability. Fusion to the forming material can be prevented by employing a mold having a forming surface of prescribed roughness. This point will be described based on FIG. 2.

FIG. 2 shows an enlarged schematic diagram of the state of contact between the mold and the forming material before and after heat-softening in a mold having a forming surface of prescribed roughness. As shown in FIG. 2, even when the forming surface of prescribed roughness fuses to a portion of the forming material with the progress of softening, the fusion does not occur over the entire forming surface, but is limited to just protruding portions, and strong adhesion does not develop between the forming material and the forming surface of the mold. Thus, it becomes easy to separate the forming material from the mold, making it possible to avoid damage to the mold and to the forming material (formed article) following softening. However, when the forming surface is excessively rough, there is a risk of affecting the shape of the upper surface of the forming material and of not being able to obtain a desired surface shape. In consideration of the above, by way of example, a mold having a plurality of irregularities with a maximum height Rmax falling within a range of 0.1 to 100 micrometers and an average spacing S between local peaks falling within a range of 0.01 to 1.00 mm is desirably employed as the mold. The above Rmax refers to a value that is measured according to the definition of surface roughness specified in JIS B0601-1982. The average spacing S between local peaks is a value measured according to the definition specified in JIS K7125. The above maximum roughness height Rmax is desirably 1 to 10 micrometers, preferably 3 to 9 micrometers. The above average spacing between local peaks S is desirably 0.01 to 0.1 mm, preferably 0.05 to 0.5 mm. The roughness of the forming surface is desirably 0.01 to 10 micrometers, preferably 0.1 to 1 micrometer, and more preferably, 0.3 to 0.9 micrometer, as arithmetic average roughness Ra measured according to the definition of surface roughness specified in JIS BO601-1982. Within the above-stated ranges, it is possible to both prevent fusion and achieve forming precision.

The above height and spacing of the irregularities can be measured primarily using a Form Talysurf made by Taylor Hobson Corp., for example. With the Form Talysurf, a ruby or a diamond is positioned at the tip of the probe; the tip of the probe is displaced over the surface of, and in contact with, the lens; and the lens surface is scanned to measure the surface shape. The measurement scanning path is normally just linear. A portion of the surface is measured. The scanning direction during measurement is perpendicular to the irregularities on the forming surface of the mold. Following measurement, the height and spacing of the irregularities on the forming surface of the mold are determined by analysis of the values measured for the height and spacing of the irregularities.

The above mold can be formed from materials that are generally employed in known molds employed in the hot sag forming method. Since metals have poor durability at 800° C., which is generally the maximum temperature of softening processing, and have high coefficients of thermal expansion, the shape is greatly deformed by thermal expansion occurring with temperature changes in the vicinity of 800° C. When the level of change is great, there is a risk that at least either the forming material or mold will not be able to withstand the difference in contraction during cooling at the contact surface between the forming material and the mold, and will be damaged. Accordingly, the mold employed in the present invention is desirably made of a heat-resistant material having good durability and a coefficient of expansion that is close to that of the forming material. Examples of the heat-resistant materials suitable as the mold material are those set forth above as the material suitable for the covering member.

The forming surface of the above-stated surface roughness can normally be obtained by grinding or cutting alone, without polishing. The forming surface is preferably a free-form shape. Thus, high-precision spherical forming materials having spherical polished surfaces and molds with a free-form shape can be combined to readily form the optical surfaces of free-form surfaces. When the forming surface has the above-stated surface roughness, a mirror-finished free-form glass optical surface can be obtained without a need for the step of polishing the forming surface to a shape having a free-form surface. This is highly advantageous from the perspectives of cost and productivity.

In the present invention, the forming material comprised of a thermosoftening substance is placed on the forming surface of the mold prior to forming. Glass can be employed as the above thermosoftening substance. Among them, glasses such as crown-based, flint-based, barium-based, phosphate-based, fluorine-containing, and fluorophosphate-based glasses are suitable. In a first example, suitable glass is glass comprising $SiO_2$, $B_2O_3$, and $Al_2O_3$ as the structural components and having the glass material composition of, given as molar percentages, 45 to 85 percent $SiO_2$, 4 to 32 percent $Al_2O_3$, 8 to 30 percent $Na_2O+Li_2O$ (with $Li_2O$ constituting equal to or less than 70 percent of $Na_2O+Li_2O$), the total quantity of ZnO and/or $F_2$ being 2 to 13 percent (where $F_2$<8 percent), $Li_2O+Na_2O/Al_2O_3$ being 2/3 to 4/1, and $SiO_2+Al_2O_3+Na_2O+Li_2O+ZnO+F_2$>90 percent.

In a second example, suitable glass are glass having the glass material composition of, given as molar percentages, 50 to 76 percent $SiO_2$, 4.8 to 14.9 percent $Al_2O_3$, 13.8 to 27.3 percent $Na_2O+Li_2O$ (where $Li_2O$ is less than or equal to 70 percent of $Na_2O+Li_2O$), the total quantity of ZnO and/or $F_2$ being 3 to 11 percent (where $F_2$<8 percent), $Li_2O+Na_2O/Al_2O_3$ being 2/3 to 4/1, and $SiO_2+Al_2O_3+Li_2O+Na_2O+Li_2O+ZnO+F_2$>90 percent.

In a third example, the glass composition is: $SiO_2$ (47.8 percent), $Al_2O_3$ (14.0 percent), $Na_2O$ (12.1 percent), $B_2O_3$ (percent), ZnO (6.0 percent), $F_2$ (2 percent), MgO (2 percent), $Li_2O$ (16.1 percent), $As_2O_3$ (0.3 percent).

In a fourth example, a further suitable glass composition is: $SiO_2$ (63.6 percent), $Al_2O_3$ (12.8 percent), $Na_2O$ (10.5 percent), $B_2O_3$ (1.5 percent), ZnO (6.3 percent), $Li_2O$ (4.8 percent), $As_2O_3$ (0.3 percent), $Sb_2O_3$ (0.2 percent).

Other metal oxides, such as MgO, PbO, CdO, $B_2O_3$, $TiO_2$, and $ZrO_2$; coloring metal oxides; and the like may be added to stabilize the glass, facilitate melting, and impart color, so long as they do not exceed 10 percent.

As further characteristics of the glass material, for example, suitable thermal properties are: a distortion point of 460 to 483° C., an annealing point of 490 to 621° C., a softening point of 610 to 770° C., a glass transition temperature (Tg) of 510 to 665° C., a yield point (Ts) of 535 to 575° C., a specific gravity of 2.47 to 3.65 (g/cm$^3$), a refractive index, Nd, of 1.52300 to 1.8061, a thermal diffusion rate of 0.3 to 0.4 cm$^2$*min, a Poisson ratio of 0.17 to 0.26, a photoelasticity constant of 2.82×10E-12, a Young's modulus of 6,420 to 9,000 kgf/mm$^2$, and a coefficient of linear expansion of 8 to 10×10E-6/° C. A distortion point of 460° C., an annealing point of 490° C., a softening point of 650° C., a glass transition temperature (Tg) of 485° C., a yield point (Ts) of 535° C., a specific gravity of 2.47 (g/cm$^3$), a refractive index, Nd, of 1.52300, a thermal diffusion rate of 0.3576 cm$^2$*min, a Poisson ratio of 0.214, a photoelasticity constant of 2.82×10E-12, a Young's modulus of 8,340 kgf/mm$^2$, and a coefficient of linear expansion of 8.5×10E-6/° C. are particularly preferred.

However, the present invention can be applied to those other than glass and is not limited to the above embodiment.

The above forming material can be obtained by processing the thermosoftening substance into a desired shape. The forming material can be processed by known methods. The shape of the forming material may be a plate shape, spherical, elliptical, a rotationally symmetric shape (toric lenses, aspherical rotationally symmetric dioptric power lenses), a free-form surface shape (progressive dioptric power lenses, aspherical dual-surface dioptric power lenses), or the like. A meniscus shape having two polished spherical surfaces is preferred. The surfaces of the forming material are desirably mirror surfaces. The roughness of the surfaces is desirably a roughness maximum height Rmax of less than or equal to 0.04 micrometer and an arithmetic average roughness Ra of less than or equal to 0.005 micrometer. The lower limit of roughness for the glass material is, for example, a maximum roughness Rmax of 0.01 micrometer and an arithmetic average roughness Ra of 0.01 micrometer.

Next, after covering the exposed portion on the forming surface side of the mold upon which the forming material has been positioned as set forth above, the forming material is heated to a temperature permitting deformation on the mold. The "temperature permitting deformation" is desirably a temperature that is greater than or equal to the glass transition temperature (Tg) in the case of the forming material comprised of glass. Heating may be conducted by a known method, such as by positioning the mold in an electric furnace. By controlling the atmospheric temperature in the electric furnace to a temperature set for the forming material, the forming material can be heated to a desired temperature. In the present invention, since the forming material is heated through the covering member as set forth above, uniform heating can be conducted. The details of temperature control will be described further below.

As shown in FIG. 1(a), prior to heating, there is a partial gap between the lower surface of the forming material and the forming surface; there is not complete, tight contact. When the forming material is heated while in this state, the fluidity of the forming material increases as it softens. As shown in FIG. 1(b), it contacts tightly with the forming surface. When the mold having a forming surface with a prescribed roughness is employed, the term "contact tightly" here does not mean a state in which the forming material penetrates into irregularities on the forming surface.

In the present invention, a mold having through-holes running from the forming surface to the opposite surface from the forming surface is desirably employed, and suction is desirably applied through the through-holes during molding. By providing through-holes in the forming surface and applying suction in this manner, the time required for deformation of the forming material can be shortened and productivity can be enhanced. As shown in the enlarged schematic drawings of FIG. 2, when employing a mold having irregularities, space remains between the forming surface and the forming material as shown in FIG. 2(b), even after heat-softening to bring the forming surface into tight contact with the lower surface of the forming material. The formation of this space has the effect of preventing the fusion, as mentioned above. On the other hand, air remains in this space and air pockets are formed. When these air pockets remain between the forming surface and the forming material, the air is sometimes trapped without being discharged. However, these air pockets create space between the forming surface and the forming material, creating the risk of impeding shape control of the glass material by the forming surface when the forming material comes into contact with the forming surface. Accordingly, when employing a mold having a forming surface of prescribed roughness as set forth above, it is desirable that through-holes are provided in the forming surface and aspiration is conducted to remove the air pockets. However, the pulse of the suction pump sometimes becomes nonuniform when the seal created by the covering member is excessively tight. Further, when aspiration is conducted up to the limit aspiration force of the suction pump, suction through the through-holes sometimes ceases. Accordingly, when providing through-holes in the forming surface and conducting aspiration, it is desirable to employ a covering member with a prescribed degree of permeability to air so as to control the flow rate during aspiration and even out the pulse of the suction pump. When a covering member having a prescribed degree of permeability to air is employed, the generation of a certain degree of negative pressure within the covering member causes an inflow of air from the exterior, making it possible to prevent the cessation of suction due to extreme negative pressure within the covering member. The air that flows into the interior of the covering member from the exterior is filtered by the covering member, preventing contamination by foreign matter such as dust and debris and preventing cleanliness issues.

To ensure a prescribed permeability to air in this manner, the covering member is desirably comprised of a porous material. The porosity is desirably 5 to 80 percent, preferably 30 to 40 percent, for example. When conducting processing to prevent particle scattering as set forth above, just the upper surface on the inside of the covering member can be treated to maintain the permeability to air of the lateral surface.

When manufacturing a casting mold, or a portion of a casting mold, for eyeglass lenses by the method of manufacturing a formed article of the present invention and employing a mold having through-holes, the openings of the through-holes on the forming surface side are desirably arranged so as not to overlap with positions corresponding to refractive index measuring parts in the eyeglass lens on the lower surface of the forming material when the forming surface of the mold and the lower surface of the forming material are in tight contact.

Specifically, the above casting mold can be employed when manufacturing eyeglass lenses by mounting two casting molds on an annular gasket and pouring lens starting material solution into a cavity formed by the casting molds and the gasket to conduct polymerization. The mold employed in this method is generally designed according to the procedures comprising determining the surface shape of an eyeglass lens (design value determination), then converting the design values for the eyeglass lens into a casting mold surface shape (determination of casting mold design values) and then converting the casting mold design values into the surface shape of a mold. Each of these conversions may be conducted by a known method The shape of the surface positioned in the cavity of the casting mold that is manufactured using the mold having the surface shape thus determined is transferred to the eyeglass lens, making it possible to form optically functional surfaces. However, when unintended deformation occurs in the casting mold being formed due to suction through the through-holes, an optically functional surface with a shape differing from that of the design values ends up being formed. The position in an eyeglass lens having the greatest effect on optical characteristics is the reference point for measurement of the dioptric power. When there is a significant shift in the surface shape of this portion from the design values, it becomes difficult to obtain an eyeglass lens of desired refractive index. Accordingly, in the method of manufacturing formed article II, to prevent the above-described deformation at spots in the casting mold surface that are transferred to positions in the eyeglass lens at which reference points for measurement of dioptric power are formed, the openings of through-holes on the forming surface of the mold are arranged so that they do not overlap positions corresponding to reference points for measurement of dioptric power on the eyeglass lens on the lower surface of the forming material when the forming surface and the lower surface of the forming material are in tight contact. Thus, it is possible to obtain a casting mold (or a portion thereof) for eyeglass lenses free of deformation caused by suction at positions corresponding to reference points for measurement of dioptric power, and the casting mold can be employed to obtain high-quality eyeglass lenses having desired optical characteristics. When the forming material is formed into a formed article (a casting mold or the portion thereof), the surface that was the upper surface of the forming material (the opposite surface from the surface in tight contact with the forming surface) is transferred to the eyeglass lens. The "position corresponding to the reference point for measuring the dioptric power" of the lower surface of the forming material is a portion of the lower surface of the forming material opposite the portion of the upper surface of the forming material serving as the portion that is transferred to the reference point for measuring the dioptric power of the eyeglass lens on the surface of the casting mold obtained.

The reference point for measuring the dioptric power of eyeglass lens will be described below.

Generally, eyeglass lenses are classified as single-vision eyeglass lenses, multifocal eyeglass lenses, or progressive dioptric power eyeglass lenses. The above-described mold can be employed for the manufacturing of any types of eyeglass lens, is suitable for the manufacturing of single-vision eyeglass lenses and progressive dioptric power eyeglass lenses, and is particularly suitable for the manufacturing of progressive dioptric power eyeglass lenses.

Reference points for measurement of the dioptric power are specified in JIS T7315, JIS T7313, or JIS T7330. The reference points for the measurement of dioptric power are portions that are enclosed by circles about 8.0 to 8.5 mm in diameter, for example, on the surface on the object side or on the eyeball side of an eyeglass lens. In single-vision eyeglass lenses, the reference point for measurement of dioptric power is located in the center of the surface of the lens. In progressive dioptric power lenses and multifocal eyeglass lenses, there are multiple reference points for measurement of dioptric power. As is set forth further below, progressive dioptric power lenses can be roughly divided into the groups of general-purpose progressive dioptric power lenses, intermediate near progressive dioptric power lenses, and near near progressive dioptric power lenses. There are two reference points for measurement of dioptric power, called the reference point for measurement of the far portion and the reference point for measurement of the near portion, in general-purpose progressive dioptric power lenses and intermediate near progressive dioptric power lenses. There are two reference points for measurement of near portions in near progressive dioptric power lenses. When manufacturing a casting mold (or a portion thereof) for the manufacturing of progressive dioptric power lenses by the method of manufacturing formed article II, the mold having no opening on the forming surface side at the positions corresponding to the above two reference points for measurement of dioptric power is employed.

Summaries of progressive dioptric power lenses are given in JIS T 7315 and JIS T 7330. Progressive dioptric power eyeglass lenses will be described below.

In progressive dioptric power eyeglass lenses, the far, intermediate, and near visual field regions are apportioned based on the frequency of use. The far region, which has a high use frequency, is often made broad, and is designed based on the emphasis of long-range or short-range. Applications vary based on differences in the breadth of the visual field region corresponding to the object distance. It is possible to distinguish three main categories: general-purpose progressive dioptric power lenses, intermediate near progressive dioptric power lenses, and near near progressive dioptric power lenses. There are also types with long-range emphasis and long-medium-range emphasis. General-purpose progressive dioptric power lenses are put to both long and short-range use, and have functions that permit both long and short-range vision. However, they are limited in the breadth of the visual field they afford in the medium and near regions. Generally, the broader the long and short-range visual field region, the greater the tendency for the distortion and swing particular to progression to be produced on the intermediate range side. Intermediate and near progressive dioptric power lenses are imparted with a broad intermediate region and near region by limiting the far region. The far region occupies a higher position than the general-purpose one and has a long progression band, so there is little of the distortion and swing particular to progression. However, such lenses are not suited to long-range vision. Near progressive dioptric power lenses primarily have near ranges and do not have far ranges; they are thus sometimes classified as single-vision lenses. All of the above categories of progressive dioptric power lenses are suitable as object lenses manufactured using casting molds in the form of formed articles manufactured by the manufacturing method of the present invention.

Progressive dioptric power lenses can be divided into three groups based on the disposition of progressive elements on the concave and convex surfaces of the lens. The first group consists of convex (external) surface progressive dioptric power lenses in which the progressive surface is disposed on the convex surface. The second group consists of concave (internal) surface progressive dioptric power lenses in which the progressive surface is disposed on the concave surface. And the third group consists of dual-surface aspherical progressive (also referred to as dual-surface compound progressive) dioptric power lenses, in which the progressive elements are divided between the two surfaces.

Convex surface progressive dioptric power lenses have a progressive surface on the convex surface, with the progressive dioptric power being formed based on the shape of the optical surface of the convex surface. Concave progressive dioptric power lenses are similar, with the exception of the difference in concavity and convexity.

Dual-surface aspherical progressive dioptric power lenses are imparted with the advantages of both "external surface progressive dioptric power lenses" and "internal surface progressive dioptric power lenses." Thus, they are progressive dioptric power lenses having a structure in which changes in the dioptric power in the vertical direction relating to the length of the progression band are distributed and positioned on the convex surface side, and changes in the dioptric power in the horizontal direction relating to swing and distortion are distributed and positioned on the concave surface side. The surface of this "dual-surface compound progression" is comprised of special aspherical surfaces that are not progressive surfaces on both surfaces, and differ structurally from the conventional progressive dioptric power lenses called "dual-surface progressive dioptric power lenses" in which the prescribed degree added is split between both surfaces being progressive surfaces. Since both surfaces of the lens can be used compositively, clear visual fields can be broadened for the far, intermediate, and near ranges. In particular, swing and distortion along the perimeter of the lens are improved.

All types of progressive dioptric power lenses are suitable as object lenses manufactured using casting molds in the form of formed articles manufactured by the manufacturing method of the present invention.

The arrangement of the above through-holes will be described below.

The number of the through-holes may be one, but a plurality of through-holes is desirably provided. The number of through-holes formed in the mold is not specifically limited and may be suitably determined. When the forming surface has a diameter of about 80 to 100 mm, for example, about 6 to 60 through-hole openings may be arranged on the forming surface. As shown in FIG. 3(a), a plurality of through-holes may be arranged evenly at equal intervals over the entire forming surface. However, the through-holes are desirably provided so that the positions corresponding to reference points for measurement of dioptric power of the eyeglass lens on the lower surface of the glass material do not overlap the openings on the forming surface side when the forming surface and the lower surface of the glass material are brought into tight contact, as set forth above.

The through-holes in the mold are desirably arranged at least in the rim portion of the forming surface, it being preferable for plural through-holes to be positioned within a range smaller than the outer diameter of the forming material on at least two concentric circles.

In this context, the term, rim portion of the forming surface means the portion surrounding the center portion of the forming surface. The term, center portion of the forming surface means, for example, a position from the center of the forming surface to about ½ the radius.

FIGS. 3(b) and (c) are examples of through-holes that have been arranged in the rim portion of the forming surface but not in the vicinity of the geometric center of the forming surface of the mold. In these cases, as well, it is desirable for the through-holes to be provided so that the positions corresponding to reference points for measurement of dioptric power in the eyeglass lens on the lower surface of the glass material do not overlap the openings on the forming surface side when the forming surface and the lower surface of the glass material are in tight contact. Further, in FIG. 5(b), the through-holes in the rim portion are arranged at equal intervals on plural concentric circles. The number of through-holes positioned per unit area is small at positions near the center, with the number of through-holes per unit area increasing with the distance from the center. That is, the through-holes are arranged in a manner increasing from the center portion toward the rim portion (with few through-holes near the center and numerous through-holes in the rim portion). As the result of research conducted by the present inventors, the arranging of through-holes in this manner, particularly when employing a glass substance as the forming material, can ensure reliable transfer properties. In addition, the present inventors discovered that heat-softening deformation could be conducted uniformly over the entire surface and that distortion within the glass material could be suppressed. The reasons for this are not yet fully known, but are presumed to be as follows.

Properties exist whereby the rate of deformation of glass materials and the tendency for such deformation to take place are greatest in the center, while the rate of deformation is relatively low and deformation tends not to occur in the perimeter portion. As shown in FIG. 1, when the lower surface of the glass material is convex and the forming surface of the mold is concave, the support portion of the glass material is the edge portion of the circumference of the glass material. In this case, the perimeter edge portion of the glass material that is supported by the forming surface tends not to move even during heat-softening, acting as an inhibiting factor on deformation caused by softening along the perimeter edge portion. The circumference portion is thought to undergo a low rate of deformation and to tend not to undergo shape deformation. However, there is no support portion in the center, so there is no factor inhibiting deformation caused by softening. The present inventors discovered that actual deformation of a glass material starts in the center portion, spreading sequentially to the perimeter portion.

However, the difference between the rate of deformation in the rim portion and in the center portion of the glass material sometimes becomes a distortion generating factor within the glass material. This is because when the center portion of the glass material deforms first by heat-softening, and deformation does not occur in the rim portion, distortion develops between the center portion and the rim portion of the glass material. The facts that the rate of deformation in the perimeter portion is low and that deformation tends not to occur there also become factors that reduce transfer precision. Accordingly, numerous through-holes are arranged in the rim portion of the forming surface of the mold, the distribution of the suction force is increased in the rim portion, where deformation tends not to occur, and few through-holes are arranged in the center portion, which tends to undergo deformation, to suitably distribute the suction force per unit area. This is thought to ensure reliable transfer properties, allow heat-softening deformation to take place uniformly over the entire surface, and prevent distortion within the glass material. In this manner, it is possible to control the difference in the rate of deformation and in the tendency to deform due to location in the glass material by the arrangement of the through-holes, enhancing the transfer reproducibility of the glass shape. Aspiration through the through-holes, as stated above, affords the advantages of shortening the deformation time of the forming material and increasing productivity.

The arrangement of the through-holes can be suitably selected for each material to be formed. For example, FIG. 3(b) is suitable in the case of a relative large curve, such as when the shape to be processed is a curve with a mean curvature of equal to or greater than 8, and FIG. 3(c) is suitable in the case of a relatively small curve, such as a curve with a mean curvature of equal to or less than 5. Further, as shown in FIG. 3(a), arranging the through-holes evenly over the entire surface is suitable for shapes with free-form surfaces, such as progressive dioptric power lenses.

To conduct high-precision forming while conducting aspiration through through-holes, it is desirable for the diameter of the through-holes, the viscosity of the forming material during aspiration, the thickness of the forming material, and the suction pressure to satisfy Equation 1 below. In particular, as set forth above, when employing a mold with a highly rough forming surface and conducting an excessive level of aspiration through the through-holes, there is a risk that the surface roughness of the forming surface and the shape of the through-holes affect the shape of the upper surface of the forming material. Thus, it is desirable to satisfy Equation 1 when conducting aspiration. It is also desirable to conduct aspiration under conditions satisfying Equation 1 to even out pulse of the suction pump and employ a covering member having a suitable degree of permeability to air, as set forth above.

[Numeral 1]

$$H = K \frac{(V) \times (T)^2}{(P)} \qquad \text{Equation 1}$$

Specifically, Equation 1 may be expressed as Equation 1-1 below.

[Numeral 2]

$$H = \frac{2.0 \times 10^{-8}(V) \times 10^2 (T)^2}{36(P)} \qquad \text{Equation 1-1}$$

In the above equations, H denotes the diameter (mm) of the through-holes, V denotes the viscosity (poise) of the forming material during aspiration, T denotes the thickness (mm) of the forming material, and P denotes the aspiration pressure (mmHg/cm$^2$), where 1 poise=0.1 Pa·s. K denotes a coefficient; 1.8 to 3.0×10$^{-9}$ is suitable.

Specifically the diameter of the through-holes can be 0.3 to 0.5 mm, the viscosity of the forming material during aspiration can be 6.81×10$^{+7}$ to 1.26×10$^{+8}$ poise, the thickness of the forming material can be 4 to 7 mm, and the aspiration pressure can be 80 to 120 mmHg/cm$^2$ (≈1.0×10$^4$ to 1.6×10$^4$ Pa/cm$^2$).

The thickness of the forming material can be assumed identical during forming. In Equation 1 above, the thickness of the forming material is the thickness at the start of forming. In the present invention, based on Equation 1 above, the temperature of the forming material during heat-softening can be monitored with a thermocouple or the like, the viscosity of the forming material can be calculated, and the aspiration pressure can be set. The aspiration pressure can also be set based on the relation between the temperature and the viscosity, the latter being calculated from the viscosity characteristics of the forming material employed.

The glass material during the suction is in a softened state by heating. The present inventors discovered that glass in a softened stage deformed as a viscoelastic material. Accordingly, the suction in the present invention is preferably conducted taking characteristics of viscoelastic deformation into account. This will be described below.

When the glass material deforms viscoelastically, either of the concavity surface and convexity surface is contracted toward the direction contacting with the surface, and the opposite surface is extended to deform. However, there is a plane (neutral surface) between the concavity surface and convexity surface where neither the contraction nor the extension occurs in the tangential direction. As for the deformation of the viscoelastic material, the degree of deformation is small and the rate of deformation is also small at a position at which the viscoelastic material is supported and fixed. In contrast, there is a tendency that, at the position away from the support position, the degree of deformation is large and the rate of deformation is also large. By way of example, the shape change of a plate viscoelastic material will be discussed. Since the degree of deformation of the viscoelastic material is clearly discussed as for the neutral surface, the target below will be the neutral surface of the viscoelastic material unless specifically indicated otherwise. As for the neutral surface of the viscoelastic material, it is known that, when it is supported and fixed at both ends with the application of a constant force (V) such as gravity, the distance X from the base point at which it is supported and fixed and the degree of deformation are denoted by the following equation:

$$w = VX2/2D*(L-X/3) \quad \text{Equation 2}$$

wherein D is a bending rigidity modulus (that is constant for the material), and L is a cross-sectional length (fixed value) of the viscoelastic material.

That is, it is understood from the above Equation 2 that the degree of deformation of the viscoelastic material changes in quadratic curve manner as it is away from the support portion, being referred to as 0. As described above, when the lower surface of the forming material is a convex surface and the forming surface of the mold is a concave surface, the glass material is positioned so that it is supported and fixed at the rim portion of the glass material as well as it is separated from the forming surface at around the center portion. Thus, it is expected that, if the glass material deforms viscoelastically, the deformation would be large at the center portion and small at the rim at which it is supported and fixed. Thus, in the glass material, there is a portion that tends not to deform merely with gravity affecting the entire glass uniformly and the deformation hardly occurs especially at a portion at which it is supported and fixed. Accordingly, the present inventors arranged the through-holes on the forming surface of the mold so that the number of the through-holes is small at the center portion at which the deformation tends to occur and the number of the through-holes is large at the edge portion of the glass material at which the deformation hardly occurs to distribute the suction force more in the rim portion. That is, the though-holes were arranged so that the number of the though-holes is minimum at the center portion and increases as being closer to the rim portion so as to supplement the above Equation 2. It is further suitable that the distribution of the through-holes increases in a quadric manner in proportion to a distance from the center according to the above equation.

The suction method will be described below based on FIG. 4. FIG. 4 is a drawing of an example of the suction method. However, the present invention is not limited to the embodiment shown in FIG. 4.

As shown in FIG. 4, mold 402, on which has been positioned a forming material, is placed on aspiration base 403. Suction is conducted by suction base 403 and suction pump part 404. Suction base 403 is a platelike hollow base in which the spots where molds are positioned is hollowed in a concave shape. It is made of a material such as heat-resistant stainless steel (SUS310S). Air inlets 407 are positioned at the spots where molds are positioned on the upper surface of the suction base. Discharge outlets for feeding aspirated air to the suction pump are located on the lower surface of the suction base and connected to suction terminal 405 that is linked to the suction pump. The suction pressure is desirably set to satisfy Equation 1 above; for example, it can be set to 80 to 120 mmHg ($\approx 1.0 \times 10^4$ to $1.6 \times 10^4$ Pa).

In addition, in the present invention, a support member can be positioned between the covering member and the mold for positioning the forming material. Thus, the position at which the forming material is positioned can be controlled precisely, yielding enhanced surface accuracy. It is possible to integrate the covering member and the support member by providing the opening of the covering member with a function for supporting the forming material. For example, by forming a protruding part on the inner lateral surface of the covering member and positioning the forming material on the mold forming surface in a state where at least a portion of the protruding part and the lateral surface of the forming material contact together, the forming material can be positioned and supported. The protruding part can be provided on the entire circumference of the inner lateral surface of the covering member, but can be partially provided thereon. For example, three or more protruding parts can be provided on the inner circumference of the inner lateral surface of the covering member, preferably at equal interval. However, it is desirable for the protruding part to be in the form of a ring running completely around the circumference of the inner lateral surface of the covering member so as to provide reliable positioning and support.

In the present invention, as set forth above, following covering an exposed portion on the forming surface side of the mold upon which the forming material has been positioned, the forming material is heated on the mold to a temperature permitting deformation. The "temperature permitting deformation" is desirably a temperature that is greater than or equal to the glass transition temperature (Tg) when the forming material is comprised of glass. Heating may be conducted by a known method, such as by positioning the mold in an electric furnace. By controlling the atmospheric temperature in the electric furnace to a temperature set for the forming material, the forming material can be heated to a desired temperature. The details of temperature control will be described further below. By heat softening in this manner, the entire surface of the lower surface of the forming material is brought into tight contact with the forming surface. Thus, the forming surface shape can be transferred to the upper surface of the forming material to form the upper surface of the forming material into a desired shape. In particular, in the present invention, a mold having a forming surface with a free-form shape is preferably employed. Accordingly, high-precision spherical forming materials having spherical polished surfaces and molds with a free-form shape can be combined to readily form the optical surface of free-form surface on the upper surface of the forming material.

The present invention further relates to a covering member for use in a forming method forming an upper surface of a forming material comprised of a thermosoftening substance into a desired shape by positioning the forming material on a forming surface of a mold and heating the forming material to a temperature permitting deformation to bring a lower surface of the forming material into tight contact with the forming surface, the covering member being used for covering an exposed portion on the forming surface side of the mold upon which the forming material has been positioned. The details of the covering member of the present invention are as set forth above.

The present invention further relates to a forming apparatus for use in a forming method forming an upper surface of a forming material comprised of a thermosoftening substance into a desired shape by positioning the forming material on a forming surface of a mold and heating the forming material to a temperature permitting deformation to bring a lower surface of the forming material into tight contact with the forming surface. The forming apparatus comprises a mold and the covering member of the present invention, and the covering member forms a covered space over an exposed portion on the forming surface side of the mold upon which the forming material has been positioned. The forming apparatus of the present invention can comprise a plurality of sets of the forming material and the covering member. When manufacturing a plurality of forming materials with different upper surface shapes, uniformity of heat distribution can be improved by combining with a covering member of which inner upper surface is roughly similar in shape to the shape of the upper surface of the forming material, as set forth above. This is suited to manufacturing of a wide variety of products in small quantities. On the other hand, a covering member with an inner upper surface that is a roughly flat surface can be employed. Since it is not required to combine the covering member corresponding to the forming material for each item, it is preferable from the perspective of mass productivity. In addition, as mentioned above, a mold having through-holes can be employed as the mold. In this case, the forming apparatus of the present invention can further comprise a suction device for reducing the pressure in the covered space. The other details of the forming apparatus of the present invention are as set forth above.

A specific embodiment of the method of manufacturing a formed article of the present invention will be described below. However, the present invention is not limited to the embodiment described below.

First, preferably in a clean room, a mold is positioned with the forming surface on top. When employing the support member, the support member is fitted into the rim portion of the forming surface and the step mount portion of the lateral surface. The forming material is then placed in a prescribed position on the forming surface along the support member. The edge surface of the lateral portion of the forming material is securely supported horizontally by the support member. The edge surface of the rim portion of the lower surface of the forming material contacts the forming surface of the mold in a vertical direction, and is securely supported. The center portion on the side of the contact surface of the forming material with the mold is separated from the forming surface of the mold. The separation distance varies with the shape of the forming surface of the mold and the lower surface of the forming surface material, but is normally about 0.1 to 2.0 mm.

Next, the covering member is desirably fitted into the support member and placed. After covering the exposed portion on the forming surface side of the mold upon which the forming material has been positioned, they are sent from the clean room to an electric furnace. The assembly of the mold, support member, forming material, and covering member is placed on the suction base of the electric furnace and heat treated with the electric furnace and suction treatment is conducted with a suction device. To reliably prevent contamination by foreign matter, the positioning of the forming material on the mold and the like is desirably conducted in a clean room in this manner.

In the electric furnace, a heat-softening treatment can be conducted while effecting temperature controls based on a preset temperature program. Either a batch-type electric furnace or a continuous feed-type electric furnace may be employed as the electric furnace. The description of a batch-type electric furnace will be given first.

A batch-type electric furnace is a device in which a piece to be processed is placed in a relatively small, confined space and the temperature within the furnace is varied according to a predetermined temperature program. It is equipped with plural sensors. The temperature is measured by the plural sensors, and each heater can be controlled to manage the temperature. In a batch-type heat-softening furnace, there is a support part holding the piece to be processed. Furthermore, the support part can move within the furnace. Imbalances in temperature distribution due to location within the furnace can be equalized by operating the support part.

A continuous feed-type electric furnace will be described next.

A continuous feed-type electric furnace is a device having an entrance and an exit, in which pieces to be processed are heat treated by being passed through the interior of an electric furnace of set temperature distribution over a certain period by a conveying device such as a conveyor. In a continuous feed-type electric furnace, plural heaters designed to generate and release heat and an internal air circulation control structure can maintain a uniform heat distribution within the furnace.

PID controls can be employed in temperature control by each sensor and heater of the electric furnace. PID controls are a control method for detecting deviation between a programmed target temperature and the actual temperature and restoring (feedback) the deviation from the target temperature to 0. PID controls are a method of obtaining an output in "Proportional", "Integral", "Differential" manner when calculating from the deviation. The general equation of PID controls is given below.

[Numeral 3]

General Equation of PID Controls:

$$y = kp\left(e + K_I \int e\,dt + K_D \frac{d}{dt}e\right)$$

P Term:

$$K_p \cdot e_n$$

I Term:

$$\int e\,dt = \lim_{\Delta t \to 0}\left(\sum_{i=0}^{n} e_i \Delta t\right) = \Delta t \Sigma_{e_n}$$

D Term:

$$\frac{d}{dt}e = \lim_{\Delta t \to 0}\left(\frac{\Delta e}{\Delta t}\right)$$

as $$\Delta e = e_n - e_{n-1}$$

$$\frac{1}{\Delta t}(e_n - e_{n-1})$$

Thus:

$$y = Kp\left[e_n + K_I \Delta t \Sigma e_n + \frac{K_D}{\Delta t}(e_n - e_{n-1})\right]$$

In the above equations, e denotes deviation, K denotes gain (the gain with the subscript P denotes proportional gain, the gain with the subscript I denotes integral gain, and the gain with the subscript D denotes differential gain), Δ(DELTA)t denotes the sample time (sampling time, control frequency), and subscript n denotes the current time.

Using PID controls makes it possible to increase the precision with which the temperature is controlled within the furnace for changes in the heat quantity distribution based on the shape and quantity of inputted pieces to be processed. A nonsliding system (for example, a walking beam) can be adopted for conveyance within the electric furnace.

In the specific embodiment of a continuous feed-type electric furnace that can be used in the present invention, the conveyance system is a nonsliding system, the temperature controls are PID temperature controls, the temperature measurement device is "K thermocouple 30 point made by Platina", a maximum use temperature is 800° C., the commonly employed temperature ranges from 590 to 650° C., the internal atmosphere is a dry air (free of oil and dust), the atmospheric control is in the form of an inlet air curtain, internal furnace purging, and an outlet air curtain, and the temperature control precision is ±3° C., and the cooling system is air cooling, and suction parts are at 3 positions within the furnace.

When employing a glass substance as a forming material, the temperature within the electric furnace can be increased from room temperature to higher than the glass transition point, but lower than the glass softening point, by heating and rising temperature. The temperature is desirably maintained lower than the glass softening point for a certain period, and then gradually reduced to room temperature.

The temperature is controlled within the electric furnace in a cycle of prescribed duration.

An example of temperature control in which an individual cycle lasts 17 hours and a glass substance is employed as the forming material will be described below. However, the present invention is not limited to the embodiment described below.

Furnace temperature control can be conducted in seven steps. The first step (A) is a preheating step. The second step (B) is a rapid heating and temperature-rising step. The third step (C) is a slow heating and temperature-rising step. The fourth step (D) is a step in which a constant temperature is maintained. The fifth step (E) is a slow cooling step. The sixth step (F) is a rapid cooling step. And the seventh step (G) is a natural cooling step.

In the preheating step (A), which is the first step, a constant temperature close to room temperature is maintained for 90 minutes. This is done in order to establish a uniform temperature distribution throughout the glass material and to facilitate reproducibility of the thermal distribution of the glass material by temperature control during processing by heat-softening. The temperature that is maintained can be any temperature of about room temperature (about 20 to 30° C.).

In rapid heating step (B), which is the second step, heating is conducted for about 90 minutes by increasing the temperature from room temperature (for example, 25° C.) to a temperature 50° C. below (also called "T1" hereinafter) the glass transition temperature (also referred to as "Tg" hereinafter) at a rate of about 4° C./min, for example. Then, in slow heating step (C), which is the third step, heating is conducted for 120 minutes by increasing the temperature from temperature T1 to a temperature about 50° C. below the glass softening point (also called "T2" hereinafter) at a rate of 2° C./min, for example. In constant temperature maintenance step (D), which is the fourth step, temperature T2 is maintained for about 60 minutes.

The glass material that has been heated to temperature T2 is heated for about 30 minutes in the constant temperature maintaining step. Heating is then conducted for another 30 minutes at temperature T2. When a mold having through-holes as described above is employed, during these latter 30 minutes, suction processing can be conducted through the through-holes in the mold. The suction processing can be conducted by operating a suction pump positioned outside the electric furnace. As shown in FIG. 4, suction pump 404 is connected to suction terminal 405, suction base 403 and through-holes in the mold, respectively. When suction is conducted by the suction pump, a negative pressure is generated. The negative pressure passes through the through-holes in the mold, applying suction to the glass material positioned in the mold. The generation of a suction of 80 to 150 mmHg ($\approx 1.0 \times 10^4$ to $1.6 \times 10^4$ Pa) through a suction inlet of the prescribed heat-resistant base mold begins 30 minutes after the start of heating at temperature T2 in the electric furnace. First, suction pump 404 outside the furnace is operated, and negative pressure is generated through suction terminal 405 within the interior of the aspiration base, which has a hollow configuration. The suction base in which negative pressure has been generated is communicated to the through-holes on the bottom surface of the mold. The through-holes on the bottom surface of the mold penetrate to the forming surface at the top of the mold and conduct suction by applying the negative pressure by suction to the glass material positioned on the mold. As set forth above, the use of a lid member of prescribed permeability to air is desirable when conducting suction through the through-holes.

Once the suction has been completed, heat-softening deformation of the glass material onto the mold is concluded. Once deformation by heat-softening has been concluded, cooling is conducted. In slow cooling step (E), the fifth step, cooling is conducted, for example, for about 300 minutes at a rate of 1° C./min to a temperature 100° C. below Tg (also called "T3" hereinafter) to fix the change in shape caused by deformation. The slow cooling step also comprises annealing elements to remove glass distortion.

Next, in rapid cooling step (F), the sixth step, cooling is conducted to about 200° C. at a rate of about 1.5° C./min. There is a risk of the glass that has been processed by softening and the mold being damaged by their own thermal contraction and differences between each other in coefficients of thermal expansion to temperature change. Accordingly, the temperature change rate is preferably small to the extent that damage does not occur.

Further, when the temperature drops to equal to or lower than 200° C., rapid cooling step (G), the seventh step, is conducted. In rapid cooling step (G), natural cooling is conducted from 200° C. to room temperature.

Once softening processing has been completed, the lower surface of the glass material and the forming surface of the mold fit precisely together. The upper surface of the glass material deforms based on the shape deformation of the lower surface of the glass material, forming the desired optical surface. Once the glass optical surface has been formed in the above steps, the glass material is removed from the mold, yielding a formed article. The formed article thus obtained can be employed as a casting mold for eyeglass lenses (preferably multifocal eyeglass lenses). Alternatively, a portion such as the rim portion can be removed and then the formed article can be employed as a casting mold for eyeglass lenses.

INDUSTRIAL APPLICABILITY

The present invention is suitable for use in forming a casting mold for eyeglass lens.

BRIEF DESCRIPTION OF THE DRAWINGS

FIG. 1 It is a schematic diagram of a mold on which forming surface a forming material is positioned and over which upper exposed portion a covering member is positioned.

FIG. 2 It shows an enlarged schematic diagram of the state of contact between the mold and the forming material before and after heat-softening in a mold having a forming surface of prescribed roughness.

FIG. 3 It shows a specific example of the arrangement of through-holes on the forming surface of a mold.

FIG. 4 It shows an example of the suction method.

FIG. 5 It is a schematic diagram of a mold on which forming surface a forming material is positioned and over which upper exposed portion a covering member is positioned without a supporting member.

FIG. 6 It shows an enlarged schematic diagram of the state of contact between the mold and the forming material of FIG. 5, before and after heat-softening in a mold having a forming surface of prescribed roughness.

The invention claimed is:

1. A method of manufacturing a formed article, wherein the formed article is a casting mold or a portion of a casting mold for the manufacture of a progressive dioptric power eyeglass lens, the method comprising:
    positioning a forming material comprising a thermosoftening substance on a forming surface of a mold, wherein the forming material has an upper surface and a lower surface, and the forming surface of the mold has a free-form shape; and
    heating the forming material to a temperature permitting deformation, resulting in bringing the lower surface of the forming material into tight contact with the forming surface, whereby the upper surface of the forming material is formed into a free-form optical surface to form the casting mold or a portion of the casting mold for the manufacture of a progressive dioptric power eyeglass lens; wherein the forming is conducted while an exposed portion on the forming surface side of the mold upon which the forming material has been positioned is covered with a covering member;
    and the mold has through-holes having a diameter in the range of 0.3 to 0.5 mm and the through-holes are provided such that positions corresponding to reference points for measurement of a dioptric power of the progressive dioptric eyeglass lens on the lower surface of the forming material do not overlap openings on the forming surface side when the forming surface and the lower surface of the forming material are brought into tight contact.

2. The method of manufacturing a formed article according to claim 1, wherein the covering member has a thermal conductivity ranging from 3 to 170 W/mk.

3. The method of manufacturing a formed article according to claim 1, wherein the covering member is comprised of a ceramic material.

4. The method of manufacturing a formed article according to claim 3, wherein the ceramic material has a porosity ranging from 30 to 40 percent.

5. The method of manufacturing a formed article according to claim 3, wherein an upper inside surface of the covering member has been subjected to processing to prevent particle scattering, and wherein the processing comprises applying a glaze to the upper inside surface of the covering member after press molding of the covering member, but before sintering of the covering member.

6. The method of manufacturing a formed article according to claim 1, wherein
    the covering member has a protruding part on an inner lateral surface thereof,
    the forming material is positioned on the forming surface of the mold in a state where the protruding part contacts with a lateral surface of the forming material at least at a portion thereof.

7. The method of manufacturing a formed article according to claim 1, wherein the covering member has an opening and an edge surface of the opening is a smooth surface.

8. The method of manufacturing a formed article according to claim 1, wherein an upper inside surface of the covering member is roughly similar in shape to the shape of the upper surface of the forming material or a roughly flat surface.

9. The method of manufacturing a formed article according to claim 1, wherein the mold has a plurality of through-holes running from the forming surface to an opposite surface from the forming surface, and comprising application of suction through the through-holes during the forming.

* * * * *